US012721784B2

(12) United States Patent
von Schenck et al.

(10) Patent No.: US 12,721,784 B2
(45) Date of Patent: *Sep. 1, 2026

(54) CHEST COMPRESSION MACHINE SYSTEMS AND METHODS

(71) Applicant: Stryker Corporation, Kalamazoo, MI (US)

(72) Inventors: Erik von Schenck, Lomma (SE); Bjarne Madsen Härdig, Lund (SE); Anders Nilsson, Lund (SE)

(73) Assignee: STRYKER CORPORATION, Portage, MI (US)

(*) Notice: Subject to any disclaimer, the term of this patent is extended or adjusted under 35 U.S.C. 154(b) by 587 days.

This patent is subject to a terminal disclaimer.

(21) Appl. No.: 18/210,408

(22) Filed: Jun. 15, 2023

(65) Prior Publication Data

US 2023/0320928 A1 Oct. 12, 2023

Related U.S. Application Data

(63) Continuation of application No. 15/946,384, filed on Apr. 5, 2018, now Pat. No. 11,712,399.

(60) Provisional application No. 62/482,163, filed on Apr. 5, 2017.

(51) Int. Cl.
*A61H 31/00* (2006.01)

(52) U.S. Cl.
CPC ..... *A61H 31/005* (2013.01); *A61H 2031/001* (2013.01); *A61H 2031/002* (2013.01); *A61H 2201/1621* (2013.01); *A61H 2201/5046* (2013.01); *A61H 2201/5058* (2013.01); *A61H 2201/5097* (2013.01); *A61H 2230/00* (2013.01); *A61H 2230/04* (2013.01); *A61H 2230/065* (2013.01); *A61H 2230/201* (2013.01); *A61H 2230/206* (2013.01)

(58) Field of Classification Search
CPC .......... A61H 31/005; A61H 2201/5058; A61H 2201/5097; A61H 2201/5046
See application file for complete search history.

(56) References Cited

U.S. PATENT DOCUMENTS

| | | | |
|---|---|---|---|
| 4,095,590 | A | 6/1978 | Harrigan |
| 4,198,963 | A | 4/1980 | Barkalow et al. |
| 4,397,306 | A | 8/1983 | Weisfeldt et al. |
| 4,424,806 | A | 1/1984 | Newman et al. |
| 4,928,674 | A | 5/1990 | Halperin et al. |

(Continued)

FOREIGN PATENT DOCUMENTS

WO WO-2016201367 A1 * 12/2016 .......... A61B 5/4848

*Primary Examiner* — Kendra D Carter
*Assistant Examiner* — Akhil Adai Jayan
(74) *Attorney, Agent, or Firm* — Miller Nash LLP

(57) ABSTRACT

Chest compression machine systems and methods adjust the administration of patient treatment based on received physiological parameter measurements, such as a $CO_2$ measurement. Adjustment of the administered chest compressions can include adjusting one or more chest compression parameters, such as the depth of the administered compressions, the administration of active decompressions, adjusting the height of active decompression, adjusting the rate of compressions and/or active decompressions and/or other changes to one or more properties, or characteristics, of the administered chest compressions and/or active decompressions.

19 Claims, 5 Drawing Sheets

(56) References Cited

U.S. PATENT DOCUMENTS

| | | | |
|---|---|---|---|
| 5,020,516 A | 6/1991 | Biondi et al. | |
| 5,261,394 A | 11/1993 | Mulligan et al. | |
| 5,490,820 A | 2/1996 | Schock et al. | |
| 5,743,864 A | 4/1998 | Baldwin | |
| 5,997,488 A | 12/1999 | Gelfand et al. | |
| 6,213,960 B1 | 4/2001 | Sherman et al. | |
| 6,676,613 B2 | 1/2004 | Cantrell et al. | |
| 6,926,682 B2 | 8/2005 | Bystrom et al. | |
| 7,008,388 B2 | 3/2006 | Sherman et al. | |
| 7,308,304 B2 | 12/2007 | Hampton et al. | |
| 7,311,680 B2 | 12/2007 | Lenhart et al. | |
| 8,343,081 B2 | 1/2013 | Walker | |
| 9,198,826 B2 | 12/2015 | Banville et al. | |
| 11,712,399 B2 | 8/2023 | von Schenck et al. | |
| 2004/0039313 A1 | 2/2004 | Sherman et al. | |
| 2004/0230140 A1 | 11/2004 | Steen | |
| 2005/0165335 A1 | 7/2005 | Sherman et al. | |
| 2006/0089574 A1 | 4/2006 | Paradis | |
| 2007/0004992 A1 | 1/2007 | Brunt et al. | |
| 2007/0225623 A1 | 9/2007 | Freeman | |
| 2007/0270724 A1* | 11/2007 | Havardsholm | A61H 31/005 601/41 |
| 2008/0103538 A1 | 5/2008 | Walker et al. | |
| 2008/0215102 A1 | 9/2008 | Myklebust et al. | |
| 2008/0312565 A1 | 12/2008 | Celik-Butler et al. | |
| 2010/0022886 A1 | 1/2010 | Ayati et al. | |
| 2010/0222718 A1 | 9/2010 | Freeman et al. | |
| 2010/0326443 A1 | 12/2010 | Steen et al. | |
| 2012/0010543 A1 | 1/2012 | Johnson et al. | |
| 2012/0116272 A1 | 5/2012 | Hampton et al. | |
| 2014/0180180 A1* | 6/2014 | Nilsson | A61H 31/006 601/41 |
| 2015/0051521 A1* | 2/2015 | Woerlee | A61H 31/005 601/41 |
| 2015/0328417 A1* | 11/2015 | Löser | A61M 16/024 128/204.23 |
| 2015/0352367 A1 | 12/2015 | Quan et al. | |
| 2016/0136042 A1* | 5/2016 | Nilsson | A61H 31/006 601/41 |
| 2016/0206504 A1 | 7/2016 | Giarracco et al. | |
| 2017/0105898 A1 | 4/2017 | Taylor et al. | |
| 2023/0320928 A1 | 10/2023 | von Schenck et al. | |

* cited by examiner

CHEST COMPRESSION MACHINE SYSTEMS AND METHODS

CROSS-REFERENCES TO RELATED APPLICATIONS

This patent application is a continuation of U.S. patent application Ser. No. 15/946,384, filed Apr. 5, 2018, which claims priority to U.S. Provisional Patent Application No. 62/482,163, filed Apr. 5, 2017, the disclosures of both of which are incorporated herein by reference in their entirety.

BACKGROUND

In medical emergencies, Cardio-Pulmonary Resuscitation ("CPR") is a potentially life-saving treatment that can be administered to a patient. CPR includes repeatedly compressing the chest of the patient to cause their blood to circulate. The chest compressions are intended to prevent damage to organs like the brain. In some instances, the chest compressions merely maintain the patient, until a more definite therapy is made available, such as defibrillation or other emergency care.

Proper administration of chest compressions can be an important influence in the outcome of a patient. The chest compressions need to be delivered at a certain rate and depth to have the greatest efficacy in stimulating blood circulation of the patient. Mechanical CPR devices can assist rescuers with the administration of effective chest compressions. Additionally, such devices can also provide active decompression which can further increase the efficacy of the administered treatment. Typically, such devices are placed on a patient and activated to administer compressions to the patient. The devices can have adjustable settings to allow a user to alter the administration of the compressions; however, these are often subjective adjustments based on a user's experience.

There exists a need for a chest compression, or mechanical CPR, device that improves the efficacy and accuracy of chest compression based on a patient's condition.

BRIEF DESCRIPTION OF THE DRAWINGS

FIG. 4 illustrates an example process of adjusting a chest compression and/or active decompression treatment.

DETAILED DESCRIPTION

Chest compression machine systems and methods are described herein. The systems and methods receive data regarding one or more patient physiological parameters, such as a $CO_2$ production of a patient, to adjust and/or alter the administration of treatment by the chest compression machine. Adjustment of the administration of treatment can include adjusting one or multiple chest compression parameters, such as the depth of chest compressions, the administration of active decompressions and/or their height, and/or the rate of chest compressions and/or active decompressions administered by the chest compression machine. In response to the received physiological parameter data, such as a $CO_2$ measurement, the chest compression machine can follow a treatment profile with options to escalate and/or de-escalate the administered treatment. The treatment profile can include various thresholds to cause, or trigger, the adjustment of treatment administered by the chest compression machine.

Figure 1:
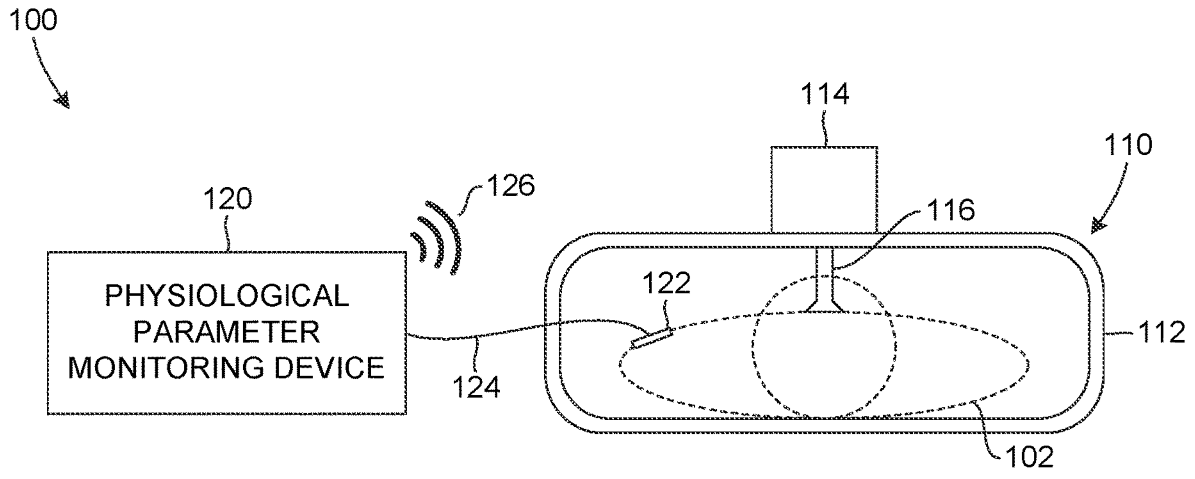
FIG. 1 illustrates an example chest compression administration system.

FIG. 1 is an example chest compression administration system 100 that includes a chest compression machine (CCM) 110, capable of administering chest compressions and/or active decompressions to a patient 102, and a physiological parameter monitoring device 120. The physiological parameter monitoring device 120 can include one or more sensors 122 that can be placed on the patient 102. The sensor(s) 122 can be connected to the physiological parameter monitoring device 120 by a sensor lead 124, to transmit sensed data, regarding the one or more physiological parameters monitored/sensed by the sensor 122, to the physiological parameter monitoring device 120. The physiological monitoring device can transmit the collected physiological parameter data, or portion thereof, to the CCM 110, such as via transmission 126.

The CCM 110 can include a frame 112 that can encircle and/or restrain the patient 102 within the CCM 110. The constraint of the patient 102 by the frame 112 can assist in preventing lateral and/or horizontal motion of the patient 102 relative to the CCM 110. The CCM 110 also includes a chest compression device 114 connected to a plunger 116 that can rest on or be affixed to the chest of the patient 102. The chest compression device 114 can cause reciprocating motion of the plunger 116 to compress the chest of the patient 102 and/or administer active decompressions by lifting the chest of the patient 102.

Active decompression of the patient 102 can assist with returning circulation to the patient and/or with ventilation of the patient. The plunger 116 can include an element to attach/affix the chest of the patient 102 to the plunger 116 to perform active decompressions by the retraction of the plunger, by the compression device 114, upwards away from the patient 102. To attach/affix the plunger 116 to the chest of the patient 102, the plunger 116 can include an end proximal the chest of the patient, the end having an attachment/affixment device, mechanism and/or system coupled thereto. The attachment/affixment, or portion thereof, can be selectively removable from the end of the plunger 116 or permanently coupled to the end of the plunger 116. An example attachment/affixment device can include an adhesive pad that can adhere to the chest of the patient 102 and couple to the end of the plunger 116. The adhesive pad can be applied to the chest of the patient prior to the administration of chest compressions and/or active decompression by the CCM 110 and can be removed from the chest of the patient 102 upon conclusion of use of the CCM 110 device. Another example attachment/affixment device can include a suction device, such as a suction cup, that can be coupled to the plunger 116 and selectively affixed to the chest of the patient 102. Once use of the CCM 110 is complete, the suction cup can be detached from the chest of the patient 102.

The chest compression device 114 can include a controller, or a controller can be coupled thereto, to control the operation of the compression device 114, including the reciprocation and/or operation of the plunger 116. The controller can control the depth to which compressions are administered to the chest of the patient 102 by controlling the extension of, and/or a force applied by, the plunger 116. Additionally, the controller can control the application of active decompression by controlling the retraction of, and/or a force applied by, the plunger 116 to control the height to which the chest of the patient 102 is lifted. The chest compression device 114 can administer sets, or cycles, of chest compressions and/or chest compressions and active decompressions to the patient 102. Additionally, the controller of the chest compression device can control the rate at which chest compressions and/or active decompressions are administered, the quantity of chest compressions and/or active decompressions administered per cycle, a pattern of the administered chest compressions and/or active decompressions and/or a rhythm of the administered chest compressions and/or active decompressions.

The controller 114 can receive physiological parameter data from the physiological parameter monitoring device 120, such as by the transmission 126, and can alter/adjust the administration of chest compressions and/or active decompressions based on the received physiological parameter data. Alternatively, or additionally, the physiological parameter monitoring device 120 can transmit a control signal to the controller of the chest compression device 114 to cause the controller to alter/adjust the administration of chest compressions and/or active decompressions by the chest compression device 114.

The physiological parameter monitoring device 120 is a device capable of monitoring, measuring and/or sensing one or more physiological parameters and/or providing measurements and/or analysis of the one or more physiological parameters. Example physiological parameter monitoring devices 120 can include a medical device, such as an external defibrillator, a ventilator, a patient monitor, a monitor/defibrillator and/or other physiological parameter monitoring devices. The physiological parameter monitoring device 120 can monitor/sense one or more physiological parameters, such as end tidal $CO_2$, SpO2, tissue oximetry, non-invasive blood pressure (NIBP), pulse detection and/or other physiological parameters. The physiological parameter data can be supplied to the CCM 110, such as by transmission 126, to assist/modify the administration of treatment to the patient 102 by the CCM 110. In an embodiment, the physiological parameter monitoring device 120, and/or functionality/features thereof, can be integrated with the CCM 110, allowing the CCM to administer treatment to and monitor physiological parameters of the patient 102.

In an embodiment, the CCM 110 can receive $CO_2$ reading/measurements and can adjust the administered chest compressions and/or the application/adjustment of active decompressions in response to the received $CO_2$ readings. The $CO_2$ readings can come from a physiological parameter monitoring device 110 and/or from a physiological parameter monitoring module of the CCM 110. For example, a $CO_2$ measuring module of the CCM 110 and/or physiological parameter monitoring device 120 can output a signal indicative of a $CO_2$ measurement of air expelled from the patient 102. The $CO_2$ measurement can be Minute Volume total, Minute Volume alveoli level for $CO_2$ output per unit time ($VCO_2$) and/or partial pressure or maximal concentration of $CO_2$ in air expelled from the patient 102 and can be expressed as a percentage of $CO_2$ or mmHg. The adjustment of chest compressions and/or active decompressions administered by the CCM 110 can assist with optimizing the $CO_2$ production of the patient 102.

In another embodiment, physiological parameters of the patient 102 can be monitored by one or more devices that do not communicate with the CCM 110. Instead, a user can review the physiological parameter data and/or measurements provided by the one or more devices and can input an alteration and/or adjustment to the CCM 110 to cause the compression device 114, and/or CCM 110, to alter the administration of chest compressions and/or active decompressions. The user can use an input of the CCM 110, such as a physical and/or electrical interface of the CCM 110, to input the adjustment and/or physiological data to cause the CCM 110 to alter the administration of chest compressions and/or active decompressions. Alternatively, or additionally, the one or more devices can provide an alteration and/or adjustment to the user, the user can then input the provided alteration/adjustment to the CCM 110 to alter the administration of chest compressions and/or active decompressions.

The alteration, or adjustment, of chest compressions and/or active decompressions administered to the patient 102 can be an ongoing process in which physiological parameter data is continuously and/or regularly assessed/monitored to alter or adjust the administration of treatment by the CCM 110. Additionally, or alternatively, the CCM 110 can include preprogrammed alterations and/or escalations of the administered treatment, the preprogrammed alterations can be performed in response to detected and/or received physiological parameter data. For example, the CCM 110 can start treatment with the administration of chest compressions and in response to the physiological parameter data, the treatment can be altered to increase the compression, begin administration of active decompressions, increase the height of the active decompressions, adjust a rate of compressions/decompressions and/or other alterations/adjustments to the chest compression parameters associated with administration of chest compressions and/or active decompressions to the patient 102.

Figure 2:
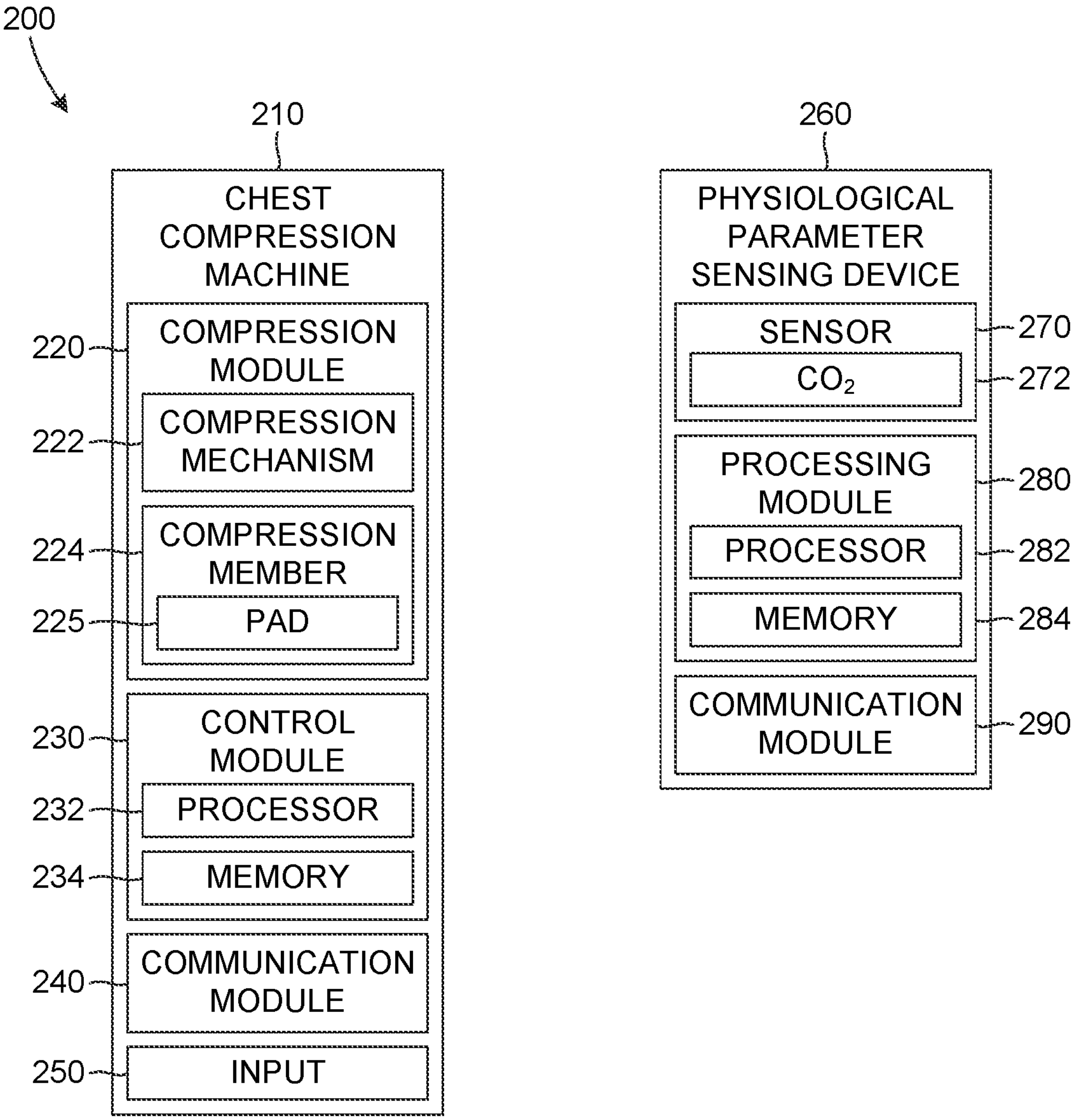
FIG. 2 illustrates an example block diagram of a chest compression machine system.

FIG. 2 is a block diagram of an example chest compression machine system 200 that includes a chest compression machine (CCM) 210 and a physiological parameter sensing device 260. While shown as separate, distinct devices, the features and/or functions, or portion thereof, of the physiological parameter sensing device 260 can be integrated with, or included in, the CCM 210. The CCM 210 can administer treatment, such as chest compressions and/or active decompressions, to a patient and the physiological parameter sensing device 260 can sense, monitor and/or measure one or more physiological parameters of the patient. Physiological parameter data from the physiological parameter sensing device 260 can be provided to the CCM 210 and the CCM 210 can alter the administration of treatment based on the received physiological parameter data.

The CCM 210 can include a compression module 220, a control module 230, a communication module 240 and an input 250. The compression module 220 can administer the chest compressions and/or active decompressions to a patient and the control module 230 can control operation of the compression module 22. The communication module 240 can communicate with one or more external user, devices and/or systems, such as the physiological parameter sensing device 260. The input 250 can provide an interface for a user to interact with the CCM 210, such as to alter, or adjust, administration of a treatment by the CCM 210.

The compression module 210 can include a compression mechanism 212 and a compression member 224. The compression mechanism 212 can drive the compression member 224 in a reciprocating motion, extending and retracting the compression member 224. The extension of the compression member 224 can administer a compression to the chest of the patient and retraction of the compression member 224 can allow the chest of the patient to rebound after application of a compression. Controlled, or driven, retraction of the compression member 224 by the compression mechanism 212 can administer an active decompression to the chest of the patient. During an active decompression the compression mechanism 212 can retract the compression member 224 to expand the chest of the patient. The compression mechanism 212 can drive the compression member 224 to administer a compression to cause the patient's chest to compress to a certain depth, or depth range, and to administer an active decompression to raise the patient's chest to a certain height, or height range. The chest compression device 212 can use one or more drive trains to drive the compression member 224, including a pneumatic drive, an electro-mechanical drive and/or an electromagnetic drive, to cause the extension and/or retraction of the chest compression member 224.

The compression member 224 can include a pad 225 that can provide an interface between the compression member 224 and the chest of the patient. The pad can be placed on the chest of the patient or coupled to the compression member 224. To perform active decompressions, the pad 225 can be affixed/attached to the patient's chest to allow the retraction of the compression member 224 to lift, and expand, the chest of the patient. Example pads 225 affixable/attachable to a patient's chest can include an adhesive pad and/or a suction cup. The adhesive pad and/or suction cup can contact and affix to the patient's chest during administration of treatment and can be removed, or unattached, when treatment is completed or stopped.

In an embodiment, the CCM 210 can administer compressions that are not followed by active decompressions. In this embodiment, the chest of the patient can be allowed to rebound before administering a further chest compression. To allow for the rebound of the chest, the compression member 224 can return to a starting position in which compression member 224 does not contact and/or does not apply a force to the patient's chest when the patient's chest is in an uncompressed state. Alternatively, or additionally, the pad 225 can have a degree of compliance, allowing the patient's chest to freely expand by compressing the pad 225 against the compression member 224. In another embodiment, the compression member 224 can be disengaged from the compression mechanism 222 to, and/or the compression mechanism 222 can, allow the chest compression member 224 to move freely at the end of a chest compressions to allow the chest of the patient to freely expand against the movable compression member 224 so that the compression member 224 does not apply a force to the chest of the patient. In a further embodiment in which the patient receives ventilation between cycles of compressions, the chest compression member can be actively raised to a height above the patient's chest and/or above a starting position, to allow the unconstrained expansion of the patient's chest while receiving ventilations. Additionally, or alternatively, compliance of the pad 225 can provide sufficient range of free expansion of the patient's chest without the exertion of a pressure or force by the compression member 224 on the patient's chest.

The control module 230 can include a processor 232 and memory 234. The processor 232 can control one or more functions and/or features of the CCM 210, such as the compression module 220, and can receive and/or analyze information, such as physiological parameter data, and alter operation of the CCM 210 based on the received/analyzed information. For example, the processor 232 can receive physiological parameter data and based on the received physiological parameter data, such as $CO_2$ measurement data, can alter the administration of chest compressions and/or active decompressions by the compression module 220. The alteration of the administration of chest compressions and/or active decompressions can be in a preprogrammed and/or a dynamic manner.

In a preprogrammed manner, the processor 232 can recall and execute one or more treatments from the memory 234 in response to the received physiological parameter data and/or analysis thereof. In a dynamic manner, the processor 232 can develop or alter a patient treatment in response to the received physiological parameter data. The development and/or alteration of the patient treatment can be based on one or more rules, such as can be stored in the memory 234, based on an algorithm, such as can be stored in the memory 234, and/or an otherwise dynamic patient treatment for the administration of chest compressions and/or active decompressions based on detected, received and/or analyzed physiological parameters of the patient.

In an example, in response to $CO_2$ measurements being below a threshold value, such as a preset threshold value, the processor 232 can cause an adjust to one or more chest compression parameters like a depth of the administered chest compressions to be increased, an addition of active decompression, an increase in the height of the active decompression and/or a change in the rate of administered chest compressions and/or active decompressions. The alterations can be based on a selected profile, such as can be recalled from the memory 234, the selected profile can increase the depth of chest compressions, the height of the active decompressions and/or the rate of chest compressions/active decompressions at a linear or other rate. The profile can also be a stair-step profile with various threshold levels of $CO_2$ measurement assigned to each step such that as the processor 232 alters the administration of chest compressions and/or active decompressions based on the step assigned the threshold $CO_2$ measurement level associated with the detected, received and/or analyzed physiological parameters. Additionally, in response to the $CO_2$ measurements being greater than the threshold, the administration of chest compressions and/or active decompressions can be decreased, such as based on a liner, stair-step and/or other profile.

The memory 234 can store and provide data to the processor 232, other systems/modules of the CCM 210 and/or external devices and/or systems. Executable instructions for the processor 232 and/or physiological parameter and/or other data can be stored in the memory 234.

The communication module 240 can transmit and/or receive data from an external device and/or system, such as the physiological parameters sensing device 260. The communication module 240 can use one or more communication protocols, networks and/or connections, such as Wi-Fi, cellular communications, satellite communications and/or Bluetooth®, to send/receive data to/from the external devices and/or systems. The communication can be a local communication, such as via a local-area network (LAN) or an ad-hoc network between the CCM 210 and an external device/system, or a wider communication, such as via the Internet or other wide-area network (WAN). Further, the communication can be a short-range communication and/or a long-range communication protocol and/or connection. The communications to and/or from the communication module 240 can also be encrypted to secure the transmitted data/information.

In an embodiment, the communication module 240 can receive physiological parameter data and/or analysis from the physiological parameter sensing device 260. The received physiological parameter data and/or analysis can be transmitted from the communication module 240 to the control module 230. The control module 230 can then alter the administration of chest compressions and/or active decompressions based on the received physiological parameter data and/or analysis, such as $CO_2$ measurements.

The input 250 can be a physical and/or electronic interface to allow a user, device and/or system to input information and/or data into the CCM 210. As a physical interface, the input 250 can be a keypad, button(s) and/or a touchscreen with which a user can interact to input information to the CCM 210. As an electronic interface, the input 250 can use the communication module 240 to communicate with an external input device and/or system. The electronic interface can also be a physical connection, such as a cord, to allow the information and/or data to be input to the CCM 210 from another device and/or system. The input information and/or data can include alterations to the administration of chest compressions and/or active decompressions. Such input can be processed by the control module 230 to alter the performance of the compression module 220.

In an embodiment, a user can use a physiological parameter monitoring/measuring device that does not communicate with the CCM 210. The user can review the collected physiological parameter data and can input the data or an alteration to the CCM 210 to cause the CCM 210 to alter the administration of chest compressions and/or active decompressions. Additionally, or alternatively, the physiological parameter monitoring/measuring device can provide a suggested alteration to the compressions and/or active decompressions and this alteration can be provided by the user to the CCM 210 via the input 250.

The physiological parameter sensing device 260 can include a sensor 270, a processing module 280 and a communication module 290. Example physiological parameter sensing devices 260 can include a defibrillator, a ventilator, a patient monitor, a monitor/defibrillator and/or other physiological parameter sensing devices. The sensor 270 can be placed on and/or near a patient to sense one or more physiological parameters and output a signal indicative of the physiological parameters and/or a values/measurements associated therewith. The collected physiological parameter data can be transmitted, such as by the communication module 290, to the CCM 210.

The sensor 270 can include one or more sensors, such as a $CO_2$ 272 sensor, to sense one or more physiological parameters of a patient. The sensor 270 can transmit sensed data and/or a signal indicative of the sensed data to the physiological parameter sensing device 260. The transmission of the data can be via a wired and/or a wireless connection between the sensor 270 and the physiological parameter sensing device 260. The $CO_2$ 272 sensor can measure various aspects of the patient's $CO_2$, such as a concentration of $CO_2$ in the air expelled from the patient.

The processing module 280 can include a processor 282 and memory 284 to control the features and/or functions of the physiological parameter sensing device 260, such as the collection, analysis and/or transmission of physiological parameter data. The processing module 280 can receive sensed physiological parameter data from the sensor 270 and can collect, analyze and/or transmit such data. As part of analysis of the physiological parameter data, the processing module 280 can include an alteration to the administration of chest compressions and/or active decompressions by the CCM 210, this alteration can be transmitted, or provided, to the CCM 210.

The communication module 290 can communicate to one or more external devices and/or systems, such as the CCM 210, using one or more communication protocols, networks and/or connections. Example communication protocols, networks and/or connections can include LAN, WAN, Wi-Fi, the Internet, cellular, satellite, Bluetooth® and/or other communication protocols and/or connections. The communication module 290 can communicate the physiological parameter data and/or an alteration, to the CCM 210.

In an embodiment, the CCM 210, such as by communication module 240, and/or the physiological parameter sensing device 260, such as by the communication module 290, can transmit treatment, physiological parameter and/or other data to an external device and/or system that can also be administering treatment to the patient. In this manner, the CCM 210, the physiological parameter sensing device 260 and/or the external device/system can coordinate treatment and/or monitoring of the patient. For example, the CCM 210 can communicate with a ventilator to alter, and/or coordinate, the administration of ventilations to the patient with the treatment administered by the CCM 210.

Figure 3:
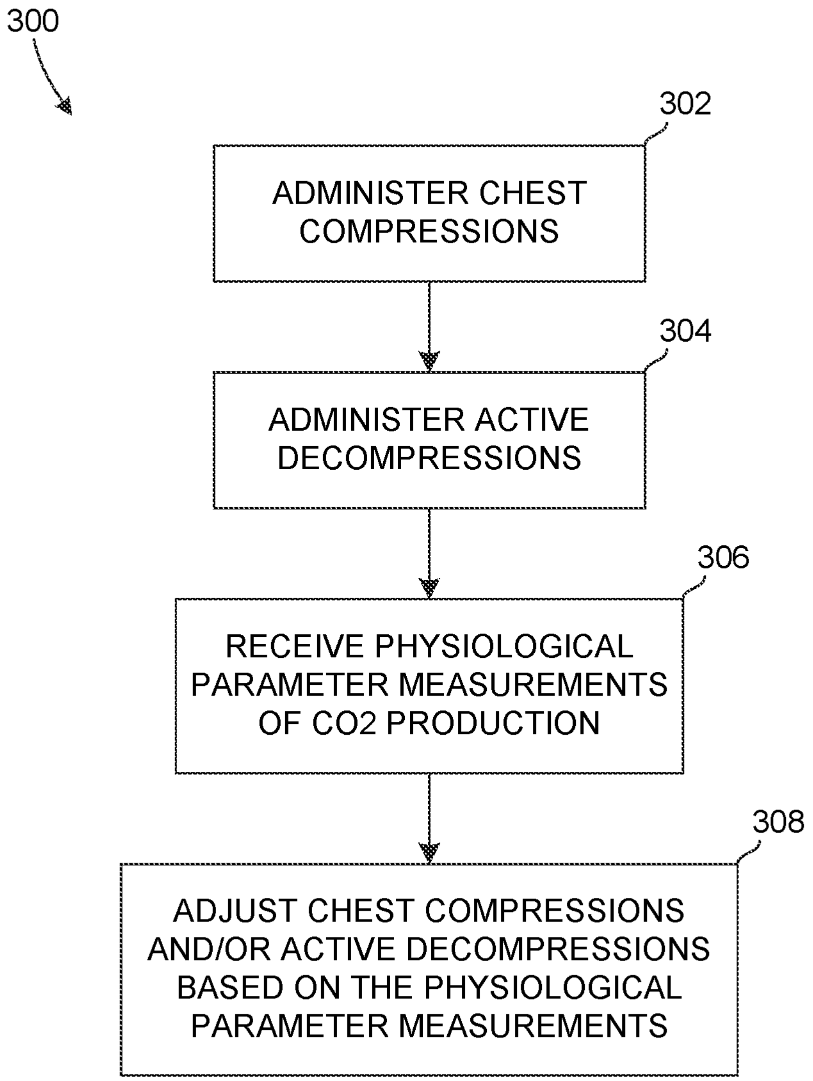
FIG. 3 illustrates an example method of altering/adjusting chest compressions.

FIG. 3 is an example method 300 of altering/adjusting chest compressions, such as administered by a CCM, in response to received physiological parameter data and/or measurements. At 302, the chest compressions are administered, such as to the patient by a CCM, a user and/or another device. At 304, active decompressions can be administered. The administration of chest compression and active decompressions can be alternating, with a chest compression followed by an active decompression, or in another pattern and/or rhythm. Additionally, the chest compressions and/or active decompressions can be administered in cycles or sets, or in a continuous manner. At 306, physiological parameter measurements of the $CO_2$ production, such as from a patient, can be received. The received measurements can be expressed as a percentage of $CO_2$ and/or mmHg and can be sensed as part of capnography. A physiological parameter monitoring device, such as a ventilator, a defibrillator, a patient monitor, a monitor/defibrillator, a CCM and/or another physiological parameter monitoring/sensing device, can provide the physiological parameter measurements that are received at 306. At 308, the administration of chest compressions and/or active decompressions can be adjusted, and/or altered, based on the physiological parameter measurements, such as received at 306. Adjustment/alteration of the chest compression parameters of the administered chest compressions and/or active decompressions can include a change to a depth of the administered chest compressions, initiating the administration of active decompressions, a change to the height of the administered active decompressions and/or change to the rate of the chest compressions and/or active decompressions. The adjustment/alteration can include increasing and/or decreasing a previous change, such as a further increasing the chest compression depth and/or reducing the chest compression depth. Additionally, the adjustment/alteration can include the addition or removal of one or more treatments, such as the addition of active decompressions to the administered chest compressions and/or cessation of active decompressions with continued administration of chest compressions.

In an embodiment, the administration of chest compressions and/or active decompressions can be adjusted in response to received physiological parameter data indicative of the $CO_2$ production of a person, such as a patient, receiving treatment. In response to the physiological parameter data indicating decreasing $CO_2$ production, or $CO_2$ production below a threshold value, or level, the administration of chest compressions and/or active decompressions can be adjusted/altered. An example response to decreasing $CO_2$ production, or $CO_2$ production below a threshold value, can include the increasing one or more variables of the treatment of the administered chest compressions and/or active decompressions. Similarly, in response to physiological parameter data indicating increasing $CO_2$ production, or $CO_2$ production above a threshold value, or level, the administration of chest compressions and/or active decompressions can be altered/adjusted. An example response to increasing $CO_2$ production, or $CO_2$ production above a threshold value, can include the decreasing one or more variables of the treatment of the administered chest compressions and/or active decompressions.

Figure 4A:
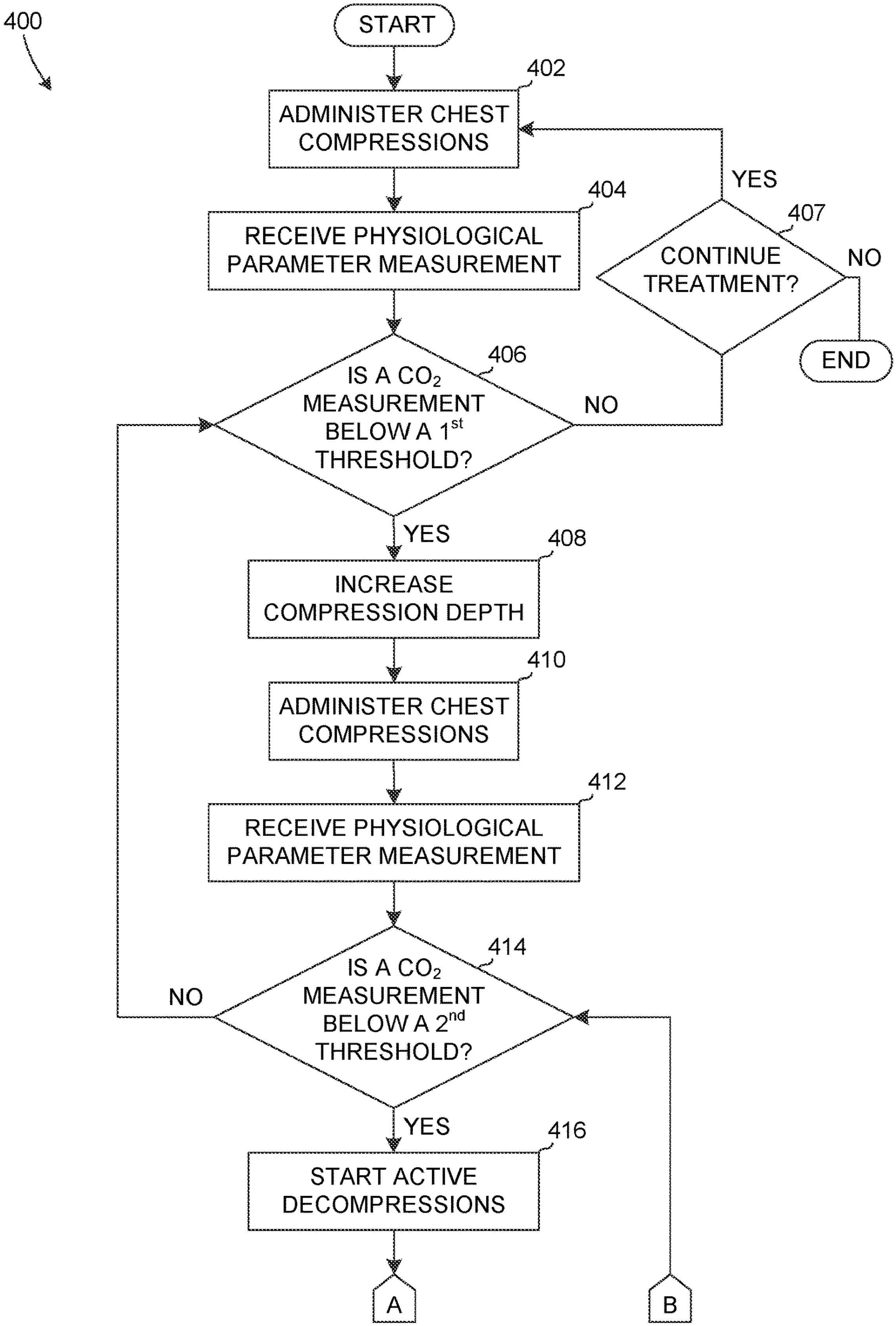
FIGS. 4A-4B illustrate an example process of adjusting a chest compression and/or active decompression treatment.
Figure 4B:
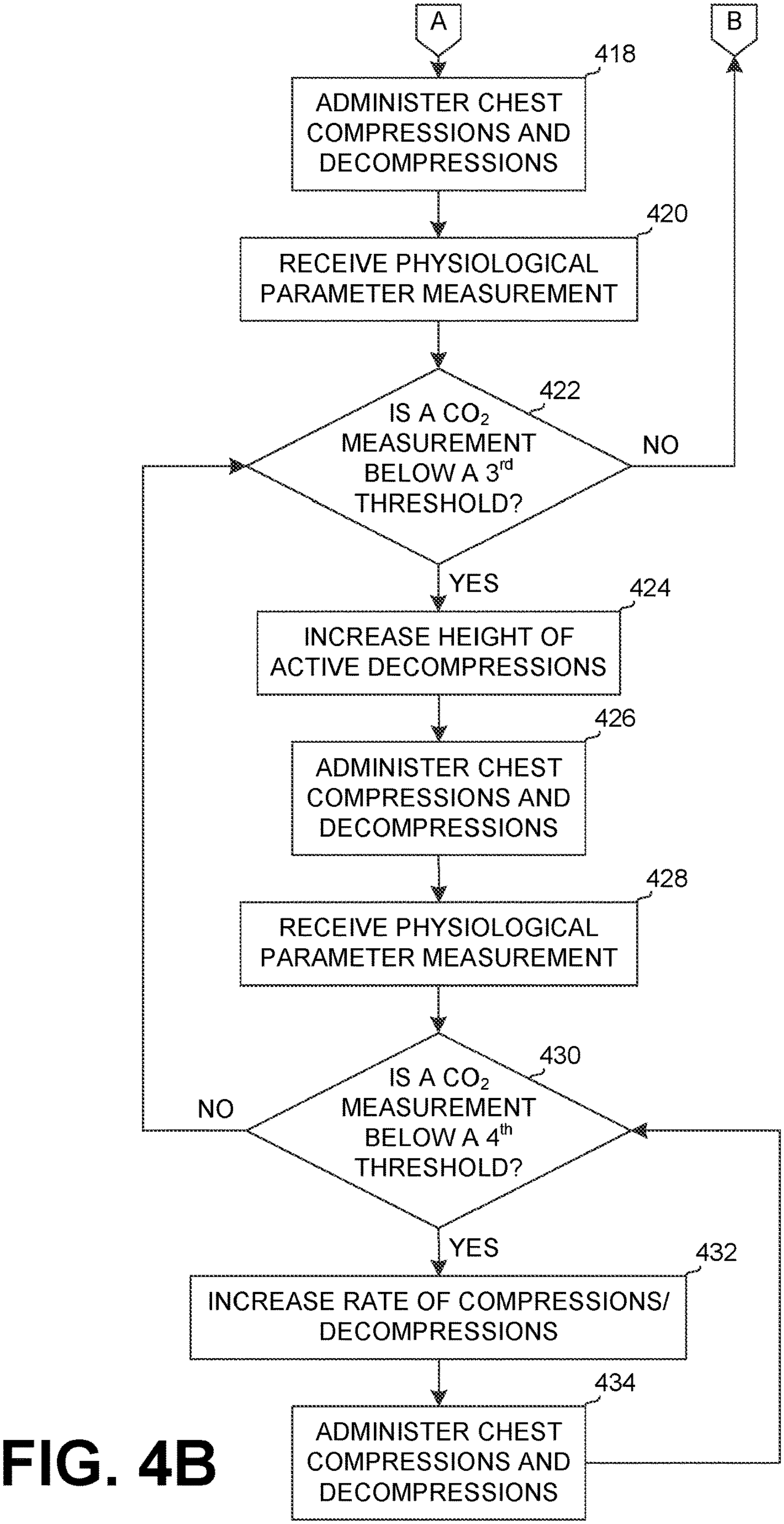

FIGS. 4A-4B is an example process 400 of adjusting a chest compression and/or active decompression treatment based on received physiological parameter data that includes a $CO_2$ measurement, such as indicative of a $CO_2$ production of a patient to which the treatment is being administered. At 402, chest compressions are administered, and at 404 a physiological parameter measurement is received. The chest compressions can be manually administered, such as by a user, and/or can be delivered by a device, or by use of device, such as a CCM. The received physiological parameter measurement can include multiple measurements of one or more physiological parameters, such as of a patient being treated. The physiological parameter measurement(s) can be received from a physiological parameter monitoring and/or sensing device, such as the CCM, a defibrillator, a ventilator, a patient monitor, a monitor/defibrillator and/or another physiological parameter monitoring/sensing device/system.

At 406, a comparison is made to determine if a $CO_2$ measurement is below a first threshold. The $CO_2$ measurement can be expressed as a percentage $CO_2$ or mmHg and can be included in the received physiological parameter measurement of 404. If the $CO_2$ measurement is below the first threshold, the administered compressions can be adjusted/altered, such as by increasing the compression depth at 408. If the $CO_2$ measurement is not below the first threshold than another decision at 407 can be made to continue treatment, which proceeds back to the administration of chest compressions 402, or the decision to end treatment can be made. The termination of treatment can be based on a user's determination, an indication by the CCM or other monitoring device, and/or other device/system. Example reasons to terminate the administration treatment can include the patient being resuscitated and/or other reasons, rationale, or indications for the termination of treatment.

At 410 chest compressions can be administered, with the chest compressions having an increased compression depth 408 due to the $CO_2$ measurement being below the first threshold at 406. At 412, a physiological parameter measurement can be received, the physiological parameter measurement(s) can include measurement(s) of the same physiological parameter(s) of 404 and/or can include measurement(s) of different physiological parameter(s). At 414, a comparison is made to determine if a $CO_2$ measurement is below a second threshold. If the $CO_2$ measurement is below the second threshold, the administered chest compressions can be adjusted/altered, such as by the inclusion of active decompressions at 416. If the $CO_2$ measurement is not below the second threshold, then the process 400 can return to the decision at 406 to determine if further increase to the compression depth at 408 is needed or if compressions can remain at the current depth.

At 418, chest compressions and the active decompressions, started at 416, are administered in response to the $CO_2$ measurement being below the second threshold at 414. At 420, a physiological parameter measurement can be received, the physiological parameter measurement(s) can include measurement(s) of the same physiological parameter(s) of 412, 404 and/or can include measurement(s) of different physiological parameter(s). At 422, a comparison is made to determine if a $CO_2$ measurement is below a third threshold. If the $CO_2$ measurement is below the third threshold, the administered chest compressions and active decompressions can be altered/adjusted, such as by increasing the height of the active decompressions at 424. The increased height of the active decompressions causes a chest of a patient to be lifted, or pulled, to a greater height, relative to the patient, than previously. If the $CO_2$ measurement is not below the third threshold, then the process 400 can return to the decisions at 414 to determine if active decompressions are still needed.

At 426, the chest compression and increased height active decompressions of 424 are administered. At 428, a physiological parameter measurement can be received, the physiological parameter measurement(s) can include measurement(s) of the same physiological parameter(s) of 420, 412, 404 and/or can include measurement(s) of different physiological parameter(s). At 430, a comparison is made to determine if a $CO_2$ measurement is below a fourth threshold. If the $CO_2$ measurement is below the fourth threshold, a rate of the administered chest compression and/or active decompressions can be adjusted/altered, such as increased at 432. If the $CO_2$ measurement is not below the fourth threshold, then the process 400 can return to the decision at 422 to determine if a further increase in the height of the active decompressions is needed, or if the process should proceed to earlier decisions, such as 414, 406.

At 434, chest compressions and/or active decompressions can be administered at the increased rate of 432. The process 400 can return to decisions 430 to further alter the rate and/or other parameters/characteristics of the administered chest compressions and/or active decompressions.

While the various elements of the process 400 are shown in a linear manner, in other embodiments, one or more elements of the process 400 can occur concurrently and/or be related to one or more elements of the process 400 in other manners, or connections, other than those shown in FIGS. 4A-4B.

In an embodiment, a user can receive the various physiological parameter measurement data and can input the data and/or adjustments/alterations to the therapy to a CCM. The various physiological parameter measurement data can be provided by a monitoring device that is not connected to the CCM. The user can provide the input to the CCM through a user interface, such as a keypad, buttons and/or a connected device. In an example, the user interface can be a button that the user can actuate to alter an operating mode of the CCM, such as causing compression depth to be increased, initiating the administration of active decompressions, adjusting the height of the active decompressions and/or increasing a rate of the chest compressions and/or active decompressions. The adjustment and/or alteration of the administered chest compressions and/or active decompressions based on and/or in response to one or more physiological parameter measurements, such as a $CO_2$ measurement indicative of a $CO_2$ production of a patient.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

We claim:

1. A chest compression machine, comprising:

a chest compression member;

a user interface electrically coupled to the chest compression machine configured to receive user input; and a control module configured to:

generate instructions to cause the chest compression member to administer chest compressions, each of the chest compressions having a plurality of chest compression parameters, receive a first carbon dioxide ($CO_2$) measurement from the user interface, alter a first chest compression parameter when the first $CO_2$ measurement is below a first threshold, receive a second $CO_2$ measurement after the first chest compression parameter has been altered, and administer active decompressions when the second $CO_2$ measurement is below a second threshold.

2. The chest compression machine of claim 1, wherein the control module is further configured to generate the instructions to cause the chest compression member to administer the chest compressions according to a treatment profile.

3. The chest compression machine of claim 1, wherein the control module is further configured to receive the first carbon dioxide ($CO_2$) measurement from one or more patient physiological parameter sensing devices.

4. The chest compression machine of claim 1, wherein the user interface is integrated with the chest compression machine.

5. The chest compression machine of claim 1, wherein the user interface is integrated with a medical device.

6. The chest compression machine of claim 1, wherein the user input comprises a $CO_2$ measurement from a medical device.

7. The chest compression machine of claim 1, wherein the user input is configured to comprise direct instructions from a user to alter at least one of the plurality of chest compression parameters.

8. A chest compression machine, comprising:

a chest compression member configured to administer one or both of chest compressions and chest decompressions according to a treatment profile, each of the one or both of the chest compressions and the chest decompressions having one or more chest compression parameters;

a user interface electrically coupled to the chest compression machine configured to receive user input; and a control module configured to:

generate instructions to cause the chest compression member to administer chest compressions according to the treatment profile, identify a first threshold corresponding to a first chest compression parameter of the chest compressions or decompressions and a second threshold corresponding to a second chest compression parameter of the chest compressions or decompressions, receive a first physiological parameter measurement from the user interface, determine that the first physiological parameter measurement is below the first threshold, based on the determination that the first physiological parameter measurement is below the first threshold, alter the first chest compression parameter, receive a second physiological parameter from the patient after the first chest compression parameter has been altered, determine that the second physiological parameter is below the second threshold, and based on the determination that the second physiological parameter is below the second threshold, generate instructions to cause the chest compression member to administer chest decompressions at a specific height.

9. The chest compression machine of claim 8, wherein, in response to the physiological parameter measurement being above the threshold, the control module being further configured to decrease at least one of the chest compression parameters.

10. The chest compression machine of claim 8, wherein, in response to the physiological parameter measurement being below the threshold, the control module being further configured to increase at least one of the chest compression parameters.

11. The chest compression machine of claim 8, wherein the user interface is integrated with the chest compression machine.

12. The chest compression machine of claim 8, wherein the user interface is integrated with a medical device.

13. The chest compression machine of claim 8, wherein the user input comprises a physiological parameter measurement from a medical device.

14. The chest compression machine of claim 8, wherein the user input is configured to comprise direct instructions from a user to alter at least one of the one or more chest compression parameters.

15. A chest compression administration system, comprising:

a chest compression machine having a chest compression member;

a user interface electrically coupled to the chest compression machine configured to receive user input;

one or more patient physiological parameter sensing devices electrically coupled to the chest compression machine; and a control module configured to:

cause the chest compression member to administer one or both of chest compressions or chest decompressions, each of the chest compressions and the chest decompressions having chest compression or decompression parameters, receive a first patient physiological parameter from one or both of the user interface and the one or more patient physiological parameter sensing devices, evaluate whether the first patient physiological parameter is below a first threshold, if the received first patient physiological parameter is below the first threshold, escalate a first compression parameter, if the received first patient physiological parameter is above the first threshold, de-escalate the first compression parameter, receive a second patient physiological parameter from the one or more patient physiological parameter sensing devices, and escalate a first chest decompression parameter to a specific height when the received second patient physiological parameter is below a second threshold.

16. The chest compression administration system of claim 15, wherein the user interface is integrated with the chest compression machine.

17. The chest compression administration system of claim 15, wherein the user interface is integrated with a medical device.

18. The chest compression machine of claim 15, wherein the user input comprises a physiological parameter measurement from a medical device.

19. The chest compression administration system of claim 15, wherein the user input is configured to comprise direct instructions from a user to alter at least one of the one or more chest compression parameters.

* * * * *